United States Patent
Woods

(10) Patent No.: US 6,594,658 B2
(45) Date of Patent: *Jul. 15, 2003

(54) METHOD AND APPARATUS FOR GENERATING QUERY RESPONSES IN A COMPUTER-BASED DOCUMENT RETRIEVAL SYSTEM

(75) Inventor: William A. Woods, Winchester, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 09/733,913

(22) Filed: Dec. 12, 2000

(65) Prior Publication Data

US 2001/0000356 A1 Apr. 19, 2001

Related U.S. Application Data

(63) Continuation of application No. 09/021,793, filed on Feb. 11, 1998, which is a continuation of application No. 08/829,657, filed on Mar. 31, 1997, which is a continuation-in-part of application No. 08/499,268, filed on Jul. 7, 1995, now Pat. No. 5,724,571.

(51) Int. Cl.[7] .............................................. G06F 17/30
(52) U.S. Cl. ................................................ 707/5; 704/9
(58) Field of Search .................................. 707/5; 704/9

(56) References Cited

U.S. PATENT DOCUMENTS 5,675,819 A * 10/1997 Schuetze ..................... 704/10
5,724,571 A * 3/1998 Woods .......................... 707/5
5,794,178 A * 8/1998 Caid et al. ................. 119/771
6,282,538 B1 * 8/2001 Woods .......................... 704/9

* cited by examiner

Primary Examiner—Diane D. Mizrahi
Assistant Examiner—Michael Spiegel
(74) Attorney, Agent, or Firm—Finnegan, Henderson, Farabow, Garrett & Dunner, L.L.P.

(57) ABSTRACT

The present mechanism relates to a method and apparatus for generating responses to queries to a document retrieval system. The system responds to a specific request for information by locating and ranking portions of text that may contain the information sought. It locates small relevant passages of text (called "hit passages") and ranks them according to an estimate of the degree to which they correspond to the information sought. The system minimizes the number of these hit passages that need to be examined before an information seeker has either found the desired information or can safely conclude that the information sought is not in the collection of texts. A relaxation ranking mechanism is provided to accommodate paraphrase variations that occur between the description of the information sought and the content of the text passages that may constitute suitable answers, by retrieving phrases that are dissimilar to the query phrase to different degrees according to a predefined set of rules, and penalizing the retrieved phrases based upon the degree of this dissimilarity, thus providing the user with a priority organized query hit list.

10 Claims, 6 Drawing Sheets

METHOD AND APPARATUS FOR GENERATING QUERY RESPONSES IN A COMPUTER-BASED DOCUMENT RETRIEVAL SYSTEM

This is a continuation of application Ser. No. 09/021,793, filed Feb. 11, 1998, which is a continuation of application Ser. No. 08/829,657, filed Mar. 31, 1997, which is a continuation-in-part of application Ser. No. 08/499,268, filed Jul. 7, 1995, now U.S. Pat. No. 5,724,571, all of which are incorporated herein by reference.

BACKGROUND OF THE INVENTION

The present invention relates to a method and apparatus for generating responses to queries to a document retrieval system. When a large corpus (database) of documents is searched for relevant terms (query terms), it is desirable to find small relevant passages of text (called "hits" or "hit passages") and rank them according to an estimate of the degree to which they will providing the information sought.

If the document database is very large, the number of hit passages generated may be far too high to be helpful to the user. Mechanisms are needed to minimize the number of hit passages that a user must examine before he or she either has found the desired information or can reasonably conclude that the information sought is not in the collection of texts.

This type of specific, "fine-grained" information access is becoming increasingly important for on-line information systems and is not well served by traditional document retrieval techniques. The problem is exacerbated with the use of small queries (of only a few words), which tend to generate larger numbers of retrieved documents.

When both the query and the size of the target (hit) passage are small, one of the challenges in current systems is that of dealing effectively with the paraphrase variations that occur between the description of the information sought and the content of the text passages that may constitute suitable answers. Literal search engines will not return paraphrases, and therefore may miss important and relevant information. Search engines that allow paraphrases may generate too many responses, often without an adequate hierarchical ranking, making the query response of minimal usefulness.

Thus, another challenge which is not currently well met is the effective ranking of the resulting hit passages. A high-quality ranking of matching document locations in response to queries is needed to enhance efficient information access.

Classical information retrieval (also called "document retrieval") measures a query against a collection of documents and returns a set of "retrieved" documents. A useful variant (called "relevance ranking") ranks the retrieved documents in order of estimated relevance to the query, usually by some function of the number of occurrences of the query terms in the document and the number of occurrences of those same terms in the collection as a whole.

Document retrieval techniques do not, however, attempt to identify specific positions or passages within the retrieved documents where the desired information is likely to be found. Thus, when a retrieved document is sufficiently large and the information sought is specific, a substantial residual task remains for the information seeker; it is still necessary to scan the retrieved document to see where the information sought might be found, if indeed the desired information is actually present in the document. A mechanism is needed to address this shortcoming.

In most previous information retrieval procedures for passage retrieval, a passage granularity is chosen at indexing time and these units are indexed and then either retrieved as if they were small documents or collections of individual sentences are retrieved and assembled together to produce passages. See Salton et al., "Approaches to Passage Retrieval in Full Text Information Systems," *Proceedings of the Sixteenth Annual International ACM SIGIR Conference on Research and Development in Information Retrieval* (*SIGIR* 93) (incorporated herein by reference), ACM Press, 1993, pp 49–58; Callan, J. P., "Passage-Level Evidence in Document Retrieval," *Proceedings of the Seventeenth Annual International ACM-SIGIR Conference on Research and Development in Information Retrieval* (*SIGIR* 93) (also incorporated herein by reference), Springer-Verlag, 1994, pp 302–310; and Wilkinson, R., "Effective Retrieval of Structured Documents," (also in *Proceedings of the Seventeenth*, etc., at pp 311–317). It would be useful to have a system that dynamically sized passages for retrieval based upon the degree to which the retrieved passage matches the query phrase.

Recently, a different approach has been proposed, based upon hidden Markov models and capable of dynamically selecting a passage. See Mittendorf et al., "Document and Passage Retrieval Based on Hidden Markov Models," (*Proceedings of the Seventeenth*, etc., pp 318–327). However, this approach does not deal with the entire vocabulary of the text material, and requires reducing the document descriptions to clusters at indexing time. It would be preferable to have a system that both encompasses the entire text base and does not require such clustering.

SUMMARY OF THE INVENTION

The present invention is directed to a method and apparatus for generating responses to queries with more efficient and useful location of specific, relevant information passages within a text. The method locates compact regions ("hit passages") within a text that match a query to some measurable degree, such as by including terms that match terms in the query to some extent ("(entailing) term hits"), and ranks them by the measured degree of match. The ranking procedure, referred to herein as "relaxation ranking", ranks hit passages based upon the extent to which the requirement of an exact match with the query must be relaxed in order to obtain a correspondence between the submitted query and the retrieved hit passage. The relaxation mechanism takes into account various predefined "dimensions" (measures of closeness of matches), including: word order; word adjacency; inflected or derived forms of the query terms; and semantic or inferential distance of the located terms from the query terms.

The system of the invention locates occurrences of terms (words or phrases) in the texts (document database) that are semantically similar to terms in the query, so as to identify compact regions of the texts that contain all or most of the query terms, or terms similar to them. These compact regions are ranked by a combination of: their compactness; the semantic similarity of the located phrases to the query terms; the number of query terms actually found (i.e. matched with some located term from the texts); and the relative order of occurrence of the located terms compared with the order or the corresponding query terms.

The identified compact regions are called "hit passages," and their ranking is weighted to a substantial extent based upon the physical distance separating the matching terms (compared with the distance between the corresponding terms in the query), as well as the "similarity" distance between the terms in the hit and the corresponding terms in the query.

The foregoing criteria are weighted and the located passages are ranked based upon scores generated by combining all the weights according the a predetermined procedure. "Windows" into the documents (variably sized regions around the located "hit passages") are presented to the user in an order according to the resulting ranking.

A significant advantage of relaxation ranking is that the system automatically generates and ranks hits that in a traditional document retrieval system would have to found by a sequence of searches using different combinations of retrieval operators. Thus, the number of times the information seeker is unsatisfied by a result—and therefore needs to reformulate the query—is significantly reduced, and the amount of effort required to formulate the query is also significantly reduced.

Another advantage is that the rankings produced by the current system are for the most part insensitive to the size or composition of the document collection and are meaningful across a group of collections, so that term hit lists produced by searching different collections can be merged, and the ranking scores from the different collections will be commensurate. This makes it possible to parallelize and distribute the indexing and retrieval process.

In addition, the system of the invention is more successful than traditional system at locating specific, relevant passages within the retrieved documents, and summarizes and displays these passages with information generated by the relaxation ranking procedure, so that the user is informed why the passage was retrieved and can thus judge whether and how to examine the hit passage.

The present invention has proven to be particularly effective at handling short queries, such as from two to six words. Accordingly, the retrieval system of the invention may handle different queries differently, using a conventional word search mechanism for searches based upon one-word queries or queries of more than six terms, and using the system of the invention for searched based upon two- to six-word queries.

DESCRIPTION OF THE PREFERRED EMBODIMENTS

The system of the invention will first be described in terms of its overall, general functionality, including specific types of ranking and penalty criteria that are used and configurations of hardware and software suitable for implementing the invention. A specific manner of implementing the relaxation ranking method is presented, as well as examples of search results generated by an actual implementation of the invention.

SECTION 1

THE APPARATUS OF THE INVENTION

Figure 1:
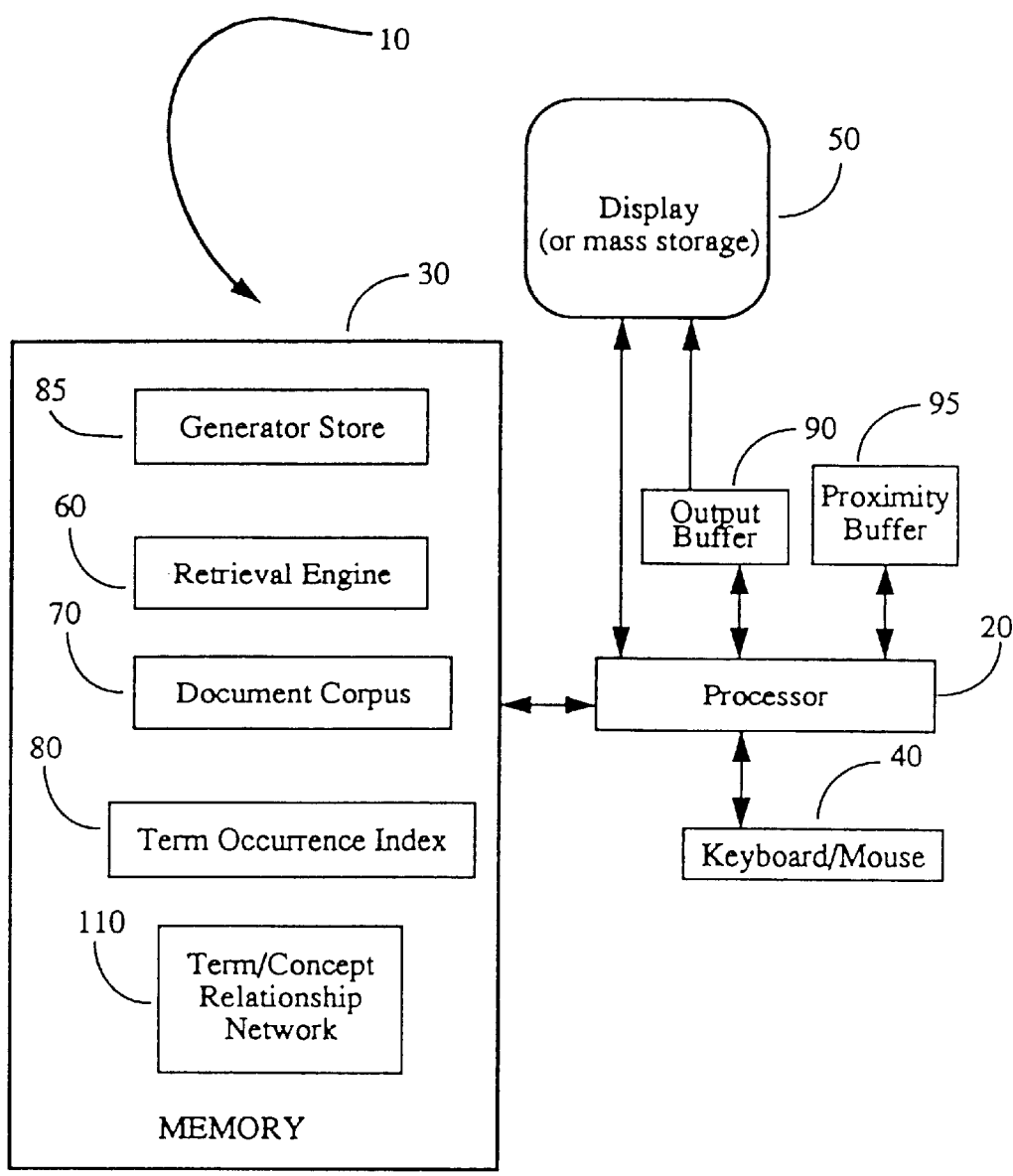
FIG. 1 is block diagram of a system of the invention.

FIG. 1 shows a computer system 10 implementing the invention. The system 10 may be a conventional personal computer or workstation, including a processor 20, a memory 30 storing the operating system, applications and data files, a keyboard and mouse 40, and a display or other output device (such as a printer) 50. The precise configuration is not crucial; for instance, the memory 30 may be a distributed memory on a network, a shared memory in a multiprocessor, and so on. Output device 50 may alternatively and equivalently be a mass storage device or any device capable of receiving the output file resulting from a search query, whether in text, graphical or other format, for storing, display or other types of output. In the present application, "display" will be used generally to encompass any of these possibilities.

Input to the system, such as search queries, are made via the keyboard and mouse 40. In addition, search queries may be generated in the course of executing applications that are stored in the memory 30 and executed on the processor 20, or they may be received from remote hosts on a network or other communication channel. The source of the search queries is thus variable, the present invention being directed to the execution of the searches and handling of the results.

Memory 30 stores software including instructions for carrying out the method of the invention, including a retrieval engine 60, which generally includes all program instructions or modules necessary to implement the invention. As will be appreciated in the following discussion, given the teaching of the present application it is a straightforward matter to generate programs or program modules to carry out the invention.

Memory 30 also stores a document corpus 70, which includes all the documents in which a search is to be carried out, and a term occurrence index 80 comprising an index of all, or some specified subset of, the terms within the document corpus, as described in further detail below. In addition, generator store 85 is a portion of memory 30 where the processor 20 temporarily stores information generated during the course of a query response, before ultimately outputting the results to output buffer 90 (connected to the processor 20) for transfer to the display 50.

The output buffer 90 is configured to store a user-defined or predetermined maximum number of hit passages, as discussed in further detail below, or the total number of hits generated by a query response, if that total is not greater than the predetermined maximum. The hit passages, i.e. the regions of retrieved text that include term hits, are stored in a ranked order according to the method of the invention, described below. ("Term hits" is used herein to refer to the individual terms that are retrieved as somehow matching the query terms.)

A proximity buffer 95 is also connected to the processor 20, and is used by the processor to store positions and sizes of "windows" onto a target document—i.e., regions in a document, of dynamically variable sizes, currently being searched by the processor for terms that match the input query terms. A window may be specified as a starting location within a target document plus a size that determines how much of the document, starting from that starting location, is to be included in a hit passage. A hit passage is that portion of the document covered by such a window, and includes hit terms, i.e. the matching terms themselves.

The hit terms and hit passages are also stored in the proximity buffer 95, correlated with the window information.

Figure 2:
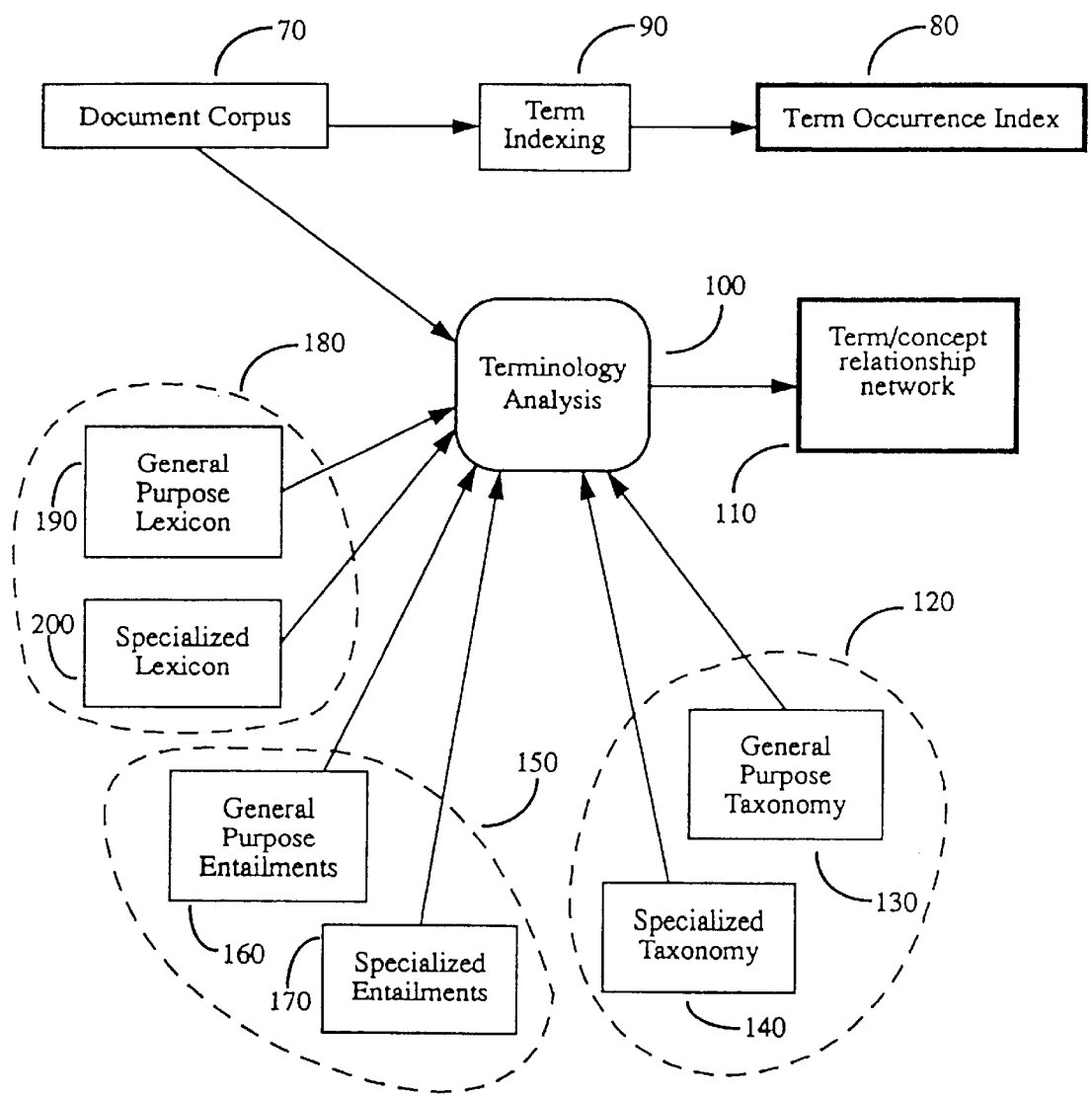
FIG. 2 is a diagram of the interacting modules of an indexing and analysis system of the invention.

FIG. 2 illustrates the how the program modules may be organized to carry out the indexing and analysis operations that are applied to the document corpus 70 of text materials to be indexed in order to produce the term occurrence index 80 and the term/concept relationship network 110 used to support subsequent query operations.

The term indexing module 90 constructs the term occurrence index 80 which is a record of all the terms that occur in the corpus 70 together with a record for each term listing the documents in which that term occurs and the positions within that document where the term occurs. This operation is a conventional operation in information retrieval.

The terminology analysis module 100 analyzes each term in the corpus 70 to construct the term/concept relationship network 110, which is a corpus-specific semantic network of terms and concepts that occur in the corpus 70, or related terms and concepts that may occur in a query, together with a variety of morphological, taxonomic, and semantic entailment relationships among these terms and concepts that may be used subsequently to connect terms in a query with terms in the text.

The construction of the term/concept relationship network 110 draws upon and makes use of a lexicon 180 composed of a general purpose lexicon 190 of information about general English words and/or words of some other language and a domain-specific specialized lexicon 200 containing terms and information about terms that are specific to the subject domain of the corpus 70. These lexicons contain information about morphological relationships between words and other information such as the syntactic parts of speech of words that are used by morphological analysis routines within the terminology analysis module 100 to derive morphological relationships between terms that may not occur explicitly in the lexicon. The operation and use of such lexicons and morphological analysis conventional in computational linguistics.

The construction of the term/concept relationship network 110 also makes use of a taxonomy 120 composed of a general purpose taxonomy 130 of taxonomic subsumption relationships (i.e., relationships between more general and more specific terms) that hold between general words and concepts of English and/or some other natural language and a domain-specific specialized taxonomy 140 of subsumption relationships that are specific to the subject domain of the corpus 70. This operation also makes use of a semantic network of semantic entailment relationships 150 composed of a general purpose entailments database 160 of semantic entailment relationships (i.e., relationships between a term or concept and other terms or concepts that entail or imply that term) that hold between general words and concepts of English and/or some other natural language, and a domain-specific entailments database 170 of semantic entailment relationships that are specific to the subject domain of the corpus 70. The operation and use of such semantic taxonomies and semantic networks are conventional in the art of knowledge representation. See John Sowa (ed.), Principles of Semantic Networks: Explorations in the Representation of Knowledge, San Mateo: Morgan Kaufmann, 1991 (incorporated herein by reference).

Each of these modules is utilized by the preferred embodiment of the invention, in a manner to be described below, though different and equivalent configurations may be arrived at to implement the invention.

SECTION 2

THE METHOD OF THE INVENTION

Figure 4:
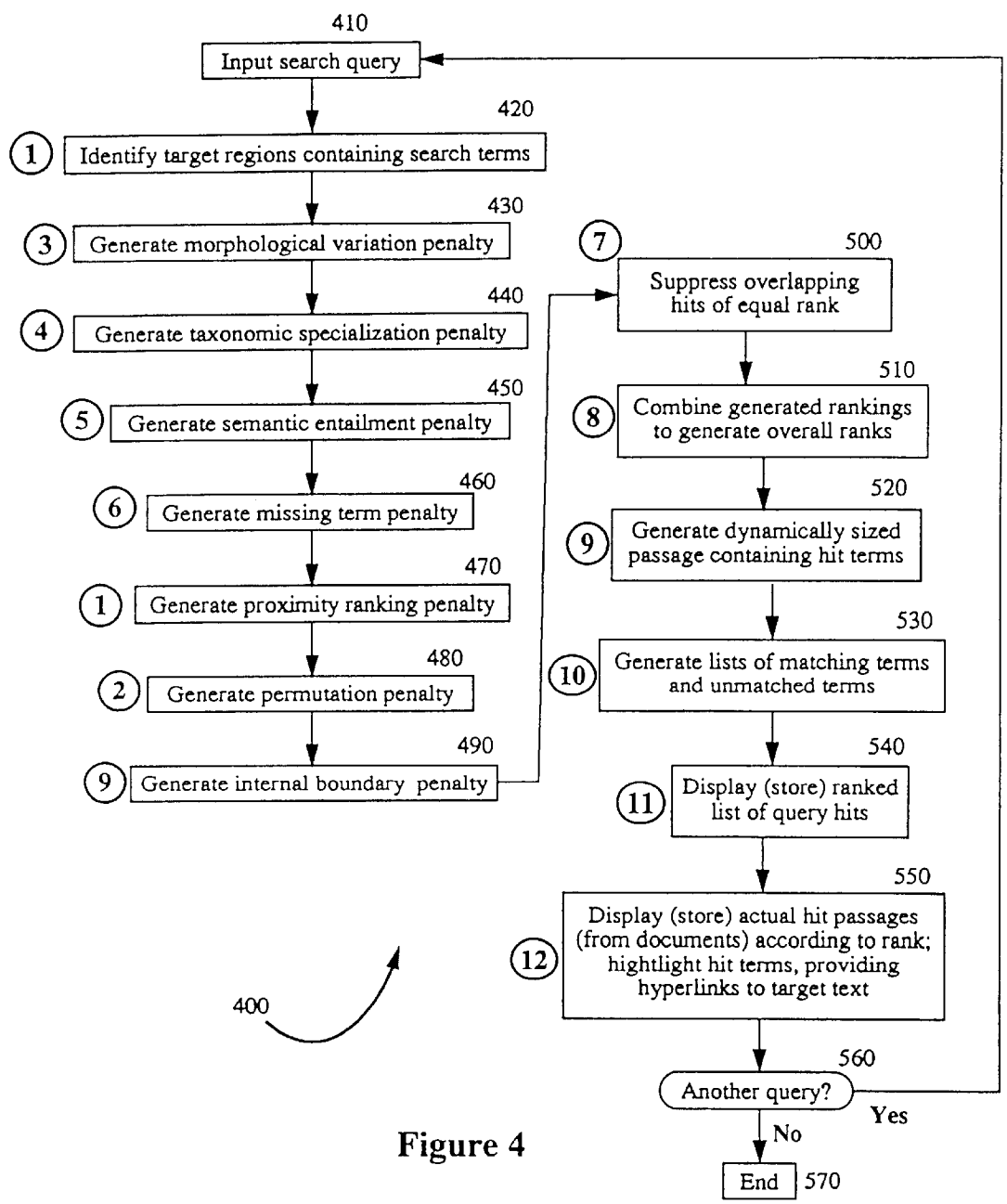
FIG. 4 is a flow chart of a generalized method for query processing according to the invention.
Figure 5:
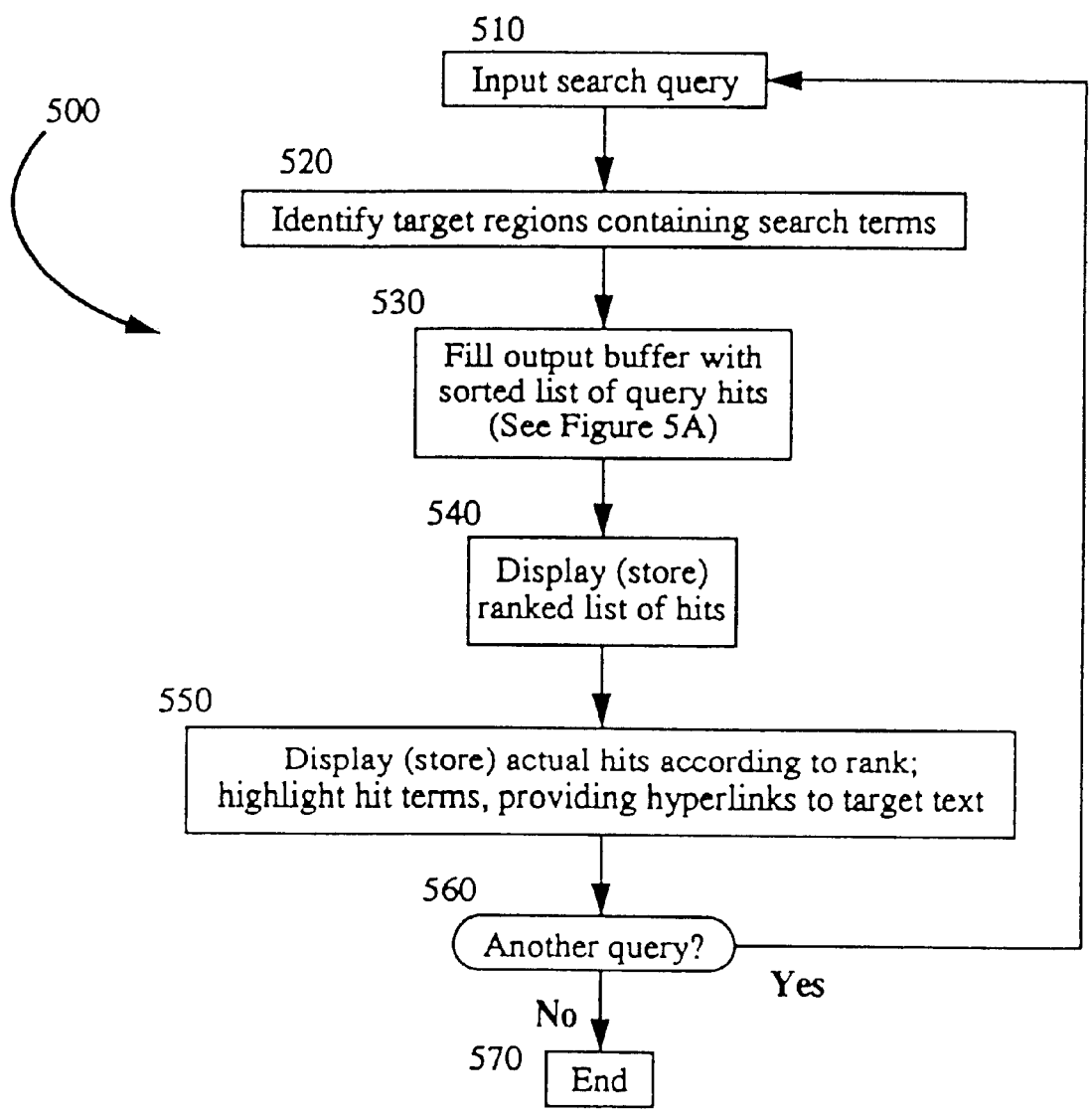
FIGS. 5–5A are flow charts illustrating a more detailed, preferred embodiment of the method of the invention.
Figure 5A:
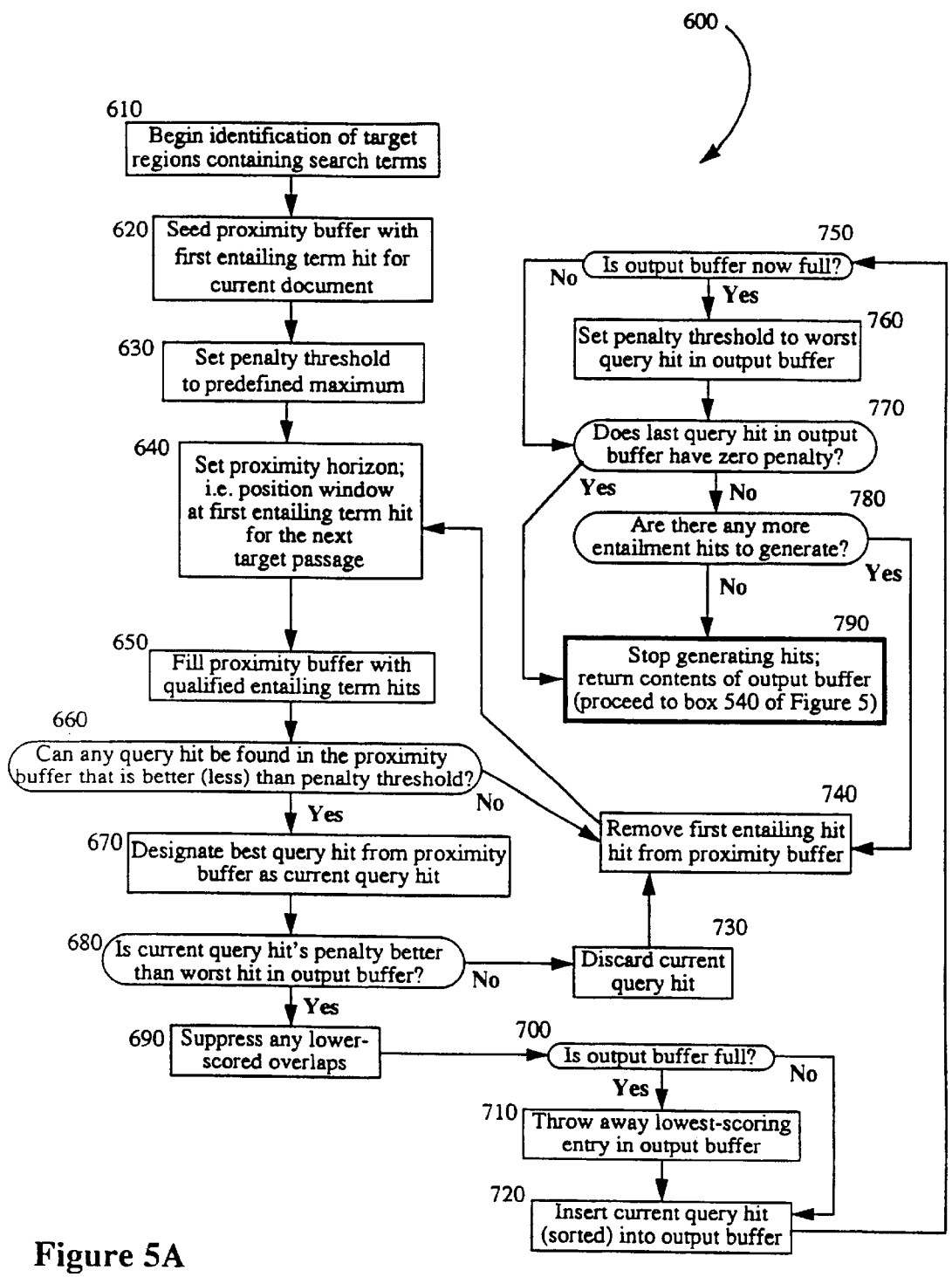

FIG. 4 illustrates a generalized embodiment of the method of the invention, and FIGS. 5–5A illustrate more specifically the steps taken according to the preferred embodiment of the invention.

2A. Basic Method: Ranking and Penalty Procedures

FIG. 4 corresponds to the twelve ranking and penalty procedures discussed below. At box 410, a search query phrase (consisting of one to many terms) is input, either entered by the user or requested by an executing process on the processor 20. Boxes 420–550 represent steps taken to penalize, rank and display the retrieved passages from the document corpus and are related to ranking procedures 1 . 12 listed below. The numerals in circles in FIG. 4 indicate the correspondingly numbered ranking criteria.

In this more general discussion, the order of listing criteria/procedures 1–12 below and the order of boxes 430–550 in FIG. 4 do not indicate a required order of ranking or penalty assignments; rather, many different such orders are possible.

The penalization and ranking criteria discussed below (especially those of procedures 1–7) are referred to herein as relaxation ranking criteria, since they allow for flexible ranking of retrieved passages of text.

Procedure 1: Proximity ranking penalties. (Boxes 420 and 470 of FIG. 4.) Hit passages are identified as compact regions of text containing one or more matches for the query terms, and the hit passages are penalized depending upon how closely or far apart the matching terms occur together; i.e. the farther apart the located terms relative to their proximity in the query phrase, the higher the penalty.

It should be noted that proximity penalization herein is not the same as the conventional information retrieval technique of using "proximity operators," in which a user specifies a set of terms and a distance threshold within which occurrences of those terms must be found in order for a match to be counted. In the traditional technique, the resulting hits are ranked by how many of the terms occur rather than by how closely the terms occur together, as in the present invention.

Procedure 2: Permutation penalties. (Box 480 of FIG. 4.) Hit passages are penalized by the degree to which their relevant phrases occur in a different order from the corresponding terms in the query phrase, using a measure of permutation distance between the order of the query terms and the order of their corresponding term hits.

Procedure 3: Morphological variation penalties. (Box 430 of FIG. 4.) Query terms are compared to terms in the target text that may be inflected or derived forms of the query terms, and are ranked by a small penalty factor so that exact matches are preferred over inflectional or derivational variants, but only slightly so.

Procedure 4: Taxonomic specialization penalties. (Box 440 of FIG. 4.) Query terms are compared to terms in the text that are more specific according to a taxonomy listing generality relationships among terms and concepts, such as taxonomies 180 in FIG. 2. Terms and concepts in the text that are more specific than terms and concepts in the query are automatically retrieved and may be ranked with a penalty for not being exact matches to the query.

Procedure 5: Semantic entailment penalties. (Box 450 of FIG. 4.) Hit passages that contain terms with a high degree of "semantic" similarity to the query terms, or that logically entail the query terms, are penalized less than those with more remote semantic similarity or a lower strength of entailment.

Procedure 6: Missing term penalties. (Box 460 of FIG. 4.) Include hit passages that contain matches for some but not all of the query terms, and penalized them according to the number of query terms that are missing from the hit passage.

In this way, when no complete matches occur, the user is automatically presented with information about the best matches that can be found. The hit passages are also ranked according to a determination of the importance of the missing terms.

Procedure 7: Overlap suppression. (Box 500 of FIG. 4.) Hit passages that overlap (i.e. occupy at least a portion of the same "window" onto a target document as) other hit passages with a better ranking are suppressed, i.e. discarded. Hit passages with the same ranking as another overlapping hit passage are likewise suppressed, since they add nothing to the overall ranking of the located document.

Procedure 8: Positional ordering. (Box 510 of FIG. 4.) All other factors being equal, hits with equal ranking scores are ordered primarily in order of a default preferred document order, and secondarily according to the positions of given hit passages within the document in which they occur.

Procedure 9: Dynamic passage sizing and internal boundary penalties. (Box 520 of FIG. 4.) Hit passages are identified by a passage of text consisting of the smallest sequence of sentences containing the hit region, or if the hit region is within a portion of text that does not have sentence structure (e.g., a table or a figure), then the smallest coherent region containing the hit region. The terms within the current query passage that were specifically involved in determining the hit passage are highlighted, if possible, when such identifications are displayed. If a sentence ending (such as a period) or paragraph boundary occurs within a given hit passage, that passage is penalized.

Procedure 10: Match summaries. (Box 530 of FIG. 4.) Hit passages are summarized by a list of the terms in the hit passages that match the corresponding terms in the query, with specific identification of query terms that are not matched in each such hit passage.

Procedure 11: Ranking of lists. (Box 540 of FIG. 4.) When the query is processed, the user is presented with a ranked list of the term hits that have been discovered, each of which has a ranking score that reports the quality of the match (with lower overall penalty totals indicating higher quality). Thus, each hit passage is identified by a match summary and a display of the passage of text that constitutes the hit. The term hits are listed in the order determined by combining the above ranking factors, and hit passages that are otherwise of equal rank are ordered according to their position in the corpus and text (i.e., hit passages in preferred documents are presented first and earlier hit passages within a document come before later hit passages).

Procedure 12: Interactive passage access. (Box 550 of FIG. 4.) Each of the term hits in the result list includes at least one active button or hyperlink that can be selected in order to view the corresponding hit passage in its surrounding context in the document within which it occurs. Hit passages are highlighted when viewed in the context of their occurrence, and the terms in the hit passage that resulted in the match are marked. The user can then move around within the document at will, and can return to the highlighted hit passage at will.

Once the procedure 400 has executed the steps 420–550, it is ready to begin with another query, as indicated at box 560 of FIG. 4, and otherwise to stop, as at box 570.

2B. Basic Method: Ranking by Physical Proximity and Similarity

The basic method of the invention is to find regions of the indexed text in which all of the query terms occur close together, or where most of the query terms (or terms similar to most of the query terms) occur close together. These hit passages are graded by the relaxation ranking criteria and presented to the user in order of this ranking.

For example, if a user has submitted a query to locate the phrase "jump to end of file" in a document corpus (such as an on-line user's manual for a text editor application), a hit passage returned by the retrieval engine might be "move the cursor to the end of the input buffer". In this case, the retrieved term "jump" corresponds to the query term "move" as a term with close semantic distance, and the intervening phrase "the cursor" leads to a small penalty on the basis of a criterion comparing the compactness of the retrieved passage vis-a-vis the original query phrase. Another retrieved passage that does not include intervening words would not receive this penalty.

In this example, the phrase "the input buffer" corresponds to the query term "file" by some measurable entailment relation. As indicated above, entailment indicates that a query term is implied to some extent a retrieved term; in this case, "input buffer" may be considered to entail the virtual presence of the term "file". One term entails another if the latter is implied by the former; in general, the entailing term will be narrower or more specific than the entailed term, but will sometimes be essentially synonymous. (Thus, "bird" entails "animal", and "plumage" entails "bird".)

The hit passage "jump to end of file" would be assigned a quantitative rank on the basis of the overall length of the hit, the number of missing terms (if any), and the strength of semantic similarity or entailment between the aligned terms of the query and the corresponding hit passage.

The method utilizes a term occurrence index (whose generation is discussed in Section 1 above) that can deliver the following information for each term of the query:

1. an enumeration of the set of all documents in the corpus that contain that term;
2. for a given document, the positions (e.g., as byte offsets) within the document where the term occurs; and
3. statistical information such as the number of occurrences of the term in the collection, the number of documents in which it occurs, the number of times it occurs in each document, and the total number of documents and word tokens in the collection.

The construction of such an index is a conventional operation in information retrieval.

The method may further use facilities (also discussed in Section 1 above) for obtaining stems or morphological variants of terms, semantically related terms, more specific terms, and terms that entail a term. Each of these related terms may have an associated numerical "similarity distance" between a query term and the retrieved term. This similarity distance is used as an associated penalty to be assigned when matching a query term against the retrieved term.

For example, for a query term "change", morphological variants would include "changed", "changing" and "interchange"; a semantically related term might be "influence"; more specific terms would include "alter" and "damage"; and an entailing term might be "move" (since moving something entails a change of position). In the description below, these related terms will be generally referred to as "similar terms" or "entailing terms", and numeric penalties are associated with each similar or entailing term based on the kind of association between the query term and the entailing term, together with the similarity distance between the two terms.

A "generator" is constructed for each term in the query. The generator is a data structure or database stored in memory that enumerates positions in documents at which the query term or any of its similar terms occur. It is these occurrences of the query term or its similar terms that are referred to as the "(entailing) term hits" for that term.

The documents in the collection are assigned an arbitrary order, such as the order in which they were indexed or preferably an ordering in which more popular, informative, or useful documents precede documents that are less likely to be useful. The generator for each query term is initialized to generate the first occurrence of a term hit for that query term in the first document in the collection in which a term hit for that term occurs.

Intuitively, the method proceeds by moving a window through each document containing any of the term hits for any of the terms of the query, determining whether that window contains a match for the query as a whole, choosing whether to extract a hit passage from that window, and if so then ranking the selected passage.

The size of the query window is determined by a (temporarily) fixed location parameter plus a window size parameter, determined as the product of a predetermined factor multiplied by the length of the query. These two parameters can be manipulated by the information seeker or an executing process, or may be set to predetermined useful values.

Figure 3:
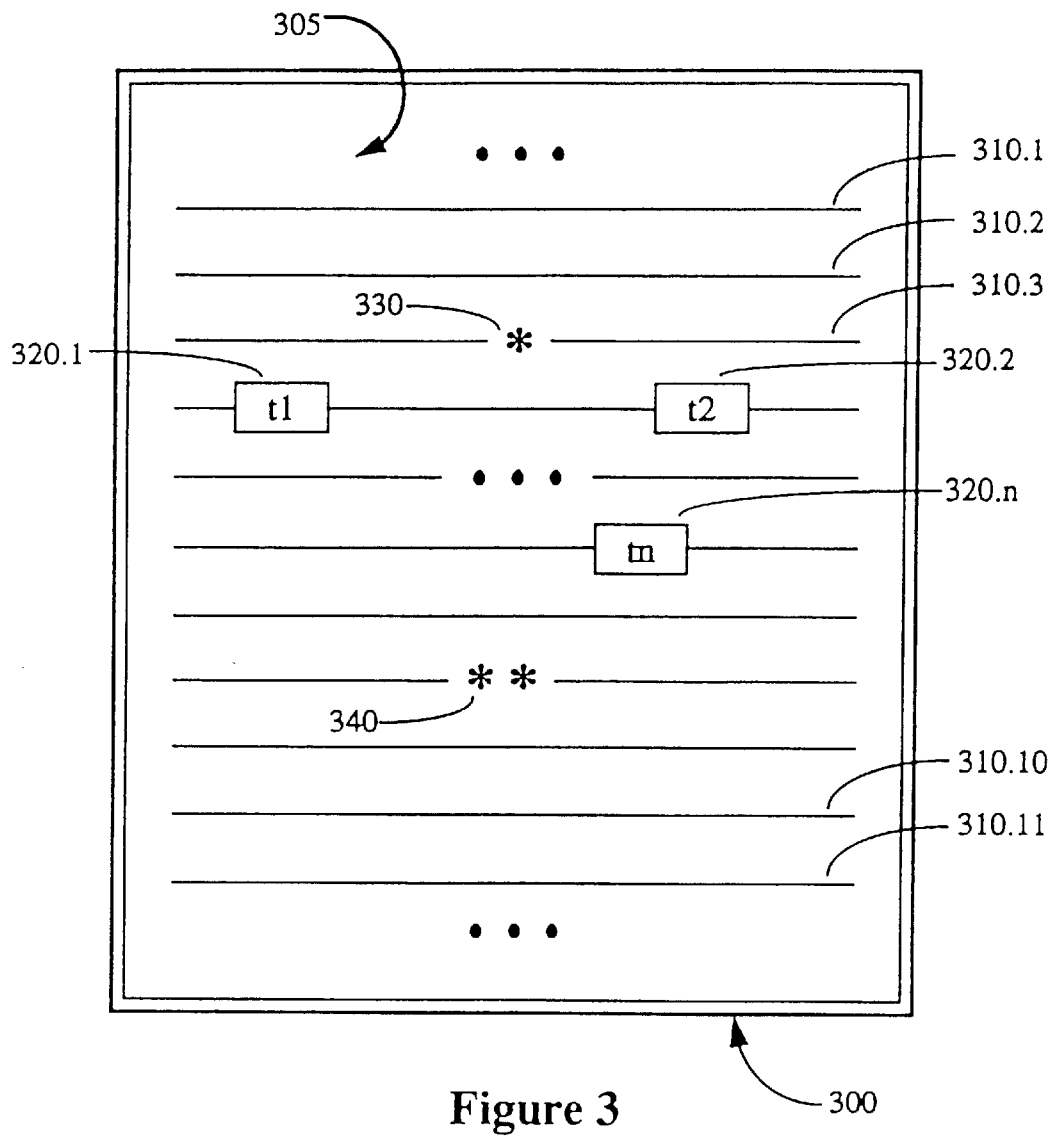
FIG. 3 is an illustration of an exemplary search result as generated by the system of the invention.

A window 300 onto a document 305 is shown in FIG. 3, and includes lines of text 310.1–310.11 including a hit passage 320 containing n terms 320.1–320.n (t1, t2, . . . , tn). The hit passage 320 has a beginning marked by a start position 330 and an end marked by an end position 340.

The window 300 can move over the body of the document 305 to include different portions thereof. For instance, as it moves down relative to the text illustrated, it will omit line 310.1 and include line 310.12 (which would be the next line below 310.11), then omit line 310.2 and include line 310.13, and so on. The use of the window construct is presented in detail below.

Other parameters (either predetermined or set by the user or a process) determine the weighting of each of the different dimensions of relaxation (e.g., proximity, permutation, morphology, taxonomy, entailment, and deletion), and two parameters specify penalties to be assigned if a hit passage contains a sentence boundary or a paragraph boundary. Each of these parameters can either be made available for manipulation by the information seeker or set to predetermined useful values. The ranking of a passages is determined by the net penalty that is the sum of its assigned penalties from various sources.

2C. General Method for Generating Hit Passages in Order of Desired Ranking

The following methodology gives a generalized procedure for generating hit passages and for ordering them in a ranking that best reflects the search query. Further below is a discussion of a specific implementation of this methodology.

Let the query q be a sequence of terms $q1, q2, \ldots, qm$, each of which is a word or phrase, and let x be a text document including a sequence of words $x1, x2, \ldots, xn$. A term-similarity distance function is used that assigns to ordered pairs of terms (p, p') a distance measure d=d(p, p'), where p and p' are terms and d is a similarity distance between the terms.

A similarity distance of zero will represent identity or full synonymy of the terms, or some other circumstance in which no penalty is assigned to matching query term p to text term p'. Larger similarity distances will correspond to terms that are only partially synonymous or otherwise related—e.g., because one is more general than another or entailed by the other, or because some sense of one is partially synonymous to some sense of the other, or because the terms are semantically similar in some other way.

Given a query q, we want to find an alignment $a=(q1, xi1), (q2, xi2), \ldots (qm, xim)$ of terms in the query with terms in the text such that (1) each pair consisting of a term from the query and a term from the text have a small similarity distance;

(2) the terms in the text that are aligned with terms in the query occur near each other in the text; and (3) we rank such an alignment more highly if the term hits in the text occur in the order that their corresponding query terms occur in the query.

Alignments are also considered that have text correspondences for only some subset of the query terms, and they are ranked worse (penalized more) than alignments that contain more of the query terms, by giving them penalties determined by the kind of term that is missing and/or the role that it plays in the query.

A similarity distance metric is organized so that, given a query term $qi$ (either a single word or a phrase including a sequence of words), a function call is made that returns a list of term-distance pairs (t1 d1), (t2, d2), . . . ,(tj, dj) in increasing order of the distance value dj, where dj is the similarity distance between the query term qi and the potential text term tj. Let us call this function "similar-terms".

The text sequence $x1, x2, \ldots, xn$ is indexed in advance, so that a function call "term-index" for a given term tj locates: (1) all of the documents in which that term occurs; and, for each document, (2) all of the positions i at which a match for the term tj occurs in the text. If tj is a sequence of words $w1, w2, \ldots, wp$, then a match exist for tj at position i if $xi=w1$, $xi+1=w2$, . . . , and $xi+p-1=wp$.

For each term qi in the query q, a sequence of term hits (exact matches or entailing "close hits") is constructed for the term qi by combining the term-index entries for that term and for all of its similar (entailing) terms. Each of these term hits will have a weight or penalty corresponding to the similarity distance between the query term and the matching text term (or zero for exact matches of the term).

Generally, the method for generating and returning hit passages for a given query q is as follows:

1. Set up a generator of term hits for each significant term in the query (certain function words such as "of" and "the" may be judged insignificant and ignored). These generators will generate term hits in documents in which a term hit occurs in the order of the documents in the collection and within a document in the order of the position of the term hit within the document.

2. Overall hit passages for the query q are generated sequentially by starting at the position of the first similar term (t) generated by any of the terms of the query. This term hit may be referred to as the "root". Thus the root for the first hit passage is the earliest word in the earliest document in the collection that is a term hit for one of the terms in the query. Then the method inspects all of the term hits generated by any of the other terms in the query that are in the same document and within a window determined by a threshold proximity distance (the proximity horizon) from the position of the root term t. For each combination of term hits from the other (non-root) generators that occur within this window, a net penalty score for this combination is computed from the distances between the individual term hits, the similarity distances or match penalties involved in each of the term hits, syntactic information about the region of the hit passage (such as whether there is a sentence or paragraph boundary contained in the hit passage) and an appropriate penalty for any term in the query that has no corresponding hit within the window (this penalty depending on the kind of word that is missing and/or its role in the query or frequency in the collection). These hit passages are also assigned a penalty for crossing a sentence boundary or crossing a paragraph boundary, depending on the parameter settings for sentence boundary penalty and paragraph boundary penalty. The best such combination is selected and generated as a hit passage for the query.

3. After generating a hit passage, the generator for the root term (t) is stepped to the next term hit for that term and the generators for all of the other terms in the query are restored to the values they had when the previous root term t was first selected. A new root is now selected (the earliest term hit of any of the currently generated term hits) and the process is repeated.

4. This process of generating hit passages for the query is repeated either until a sufficient number of zero penalty hit passages has been generated (determined by a specified limit), or until there are no more term hits to generate, after which all of the hit passages that have been found are sorted by their net overall penalty. Hit passages that are contained within or overlap better hit passages or earlier hit passages with the same score are suppressed, and the best remaining hit passages (up to the specified limit) are presented to the information seeker in order of their overall penalty score (smallest penalty first). Alternatively, hit passages can be provided to a display window as they are generated and each new hit is inserted into the display at the appropriate rank position as it is encountered. To avoid replacing a displayed hit passage that overlaps with a later better hit passage, sending hit passages to the display should be delayed until the search window has moved beyond the point of overlap.

5. Each hit passage in the presented query hits list is displayed with its penalty score, a summary of the match criteria (including a list of the corresponding term hits for each query term), an identification of the position of the passage within its source document (such as a document id and the byte offsets of the beginning and end of the passage), and the text string of the retrieved passage. The retrieved passage is determined by starting with the latest sentence or segment boundary in the source document that precedes the earliest term hit in this match and ends at the first sentence or segment boundary that follows the latest term hit.

6. The displayed term hit list can be used to access a display of the retrieved passages in the context in which they occur. This is done by opening a viewing window on the document on which the passage occurs, positioning the text within the viewing window so that the retrieved passage is visible within it, highlighting the passage within the window, and if possible marking the term hits that justified the passage so that they are visible to the user.

Unlike conventional document retrieval, the system of the present invention locates specific passages of information within the document, not simply the document itself. This is similar to what has been called "passage retrieval" in information retrieval literature, but in the present invention the passages are constructed dynamically in response to the query using a general-purpose full-text index of terms and positions, and the size and granularity of the passage is variable depending on what is found in the match.

2D. Examples of Queries and Results

The following example is a portion of a summarized term hit list produced by an actual implementation of this method used by applicant, indexing the tutorial documentation for the well-known Emacs text editor. In the listing, each hit entry comprises a data structure including a sequence number, a penalty score, a list of matching terms, the document in which the hit occurred, and the positions of the hit within the document in the following format:

++++++++++++++++++++++<hit sequence number>
(hit <penalty score><list of matching terms>
  <file where hit was found><beginning position>
  <end position>)
<retrieved text passage>

Here are results generated for the query phrase "move to end of file", i.e. a search in a predefined document corpus for this phrase. (The document corpus in this example, as noted above, is a portion the Emacs text editor documentation.)

The first three entries of the resulting hit list were:
++++++++++++++++++++ 1
  (hit 0.115 ("GO" "TO" "END" "FILE") "/home/emacs-tutorial" 5881 5898) M->Go to end of files
++++++++++++++++++++ 2
  (hit 0.155 ("MOVES" "TO" "END" "FILE") "/home/emacs-tutorial" 4984 5012) which moves to the end of the file.
++++++++++++++++++++ 3
  (hit 2.849 ("DASHES" (MISSING TO) "ENDS" "FILE")
  "home/emacs-tutorial" 15624 15753)
begins and ends zenith dashes, and contains the string "Emacs: TUTORIAL". Your copy of the Emacs tutorial is called "TUTORIAL". Whatever file you find, that file's name will appear in that precise spot.
(The italicized portions above are the actual retrieved hit passages located as matches for the input query phrase "move to end of file".)

The following excerpted portions of the associated text for the above results illustrate the display of the respective hit passages in context, in which the hit region (passage) is underlined, and the located term hits appear in bold:
No. 1. For hit 0.115 ("GO" "TO" "END" "FILE"):
  M-a Move back to beginning of sentence
  M-e Move forward to end of sentence
  M-<Go to beginning of file
  M->Go to end of file
>>Try all of these commands now a few times for practice. Since the last two will take you away from this screen, you can come back here with M-v's and C-v's. These are the most often used commands.
No. 2. For hit 0.155 ("MOVES" "TO" "END" "FILE"):
  Two other simple cursor motion commands are: M-< (Meta Less-than), which moves to the beginning of the file, and M->(Meta Greater-than), which moves to the end of the rile. You probably don't need to try them, since finding this spot again will be boring. On most terminals the "<" is, above the comma and you must use the shift key to type it. On these terminals you must use the shift key to type M-< also; without the shift key, you would be typing M-comma.

No. 3. For hit 2.849 ("DASHES" (MISSING TO) "ENDS" "FILE"):

If you look near the bottom of the screen you will see a line that begins and ends with dashes, and contains the string "Emacs: TUTORIAL". Your copy of the Emacs tutorial is called "TUTORIAL". Whatever file you find, that file's name will appear in that precise spot.

There is a gradual relaxation from good matches to successively less likely matches, with appropriate penalty scores to indicate the degree of poorness of the match. In this example, penalty scores greater than 2 indicate substantial likelihood that the match is not useful. Note that the system is not sensitive to how context determines senses of words, so it accepts "dashes" as a specialization of "move" even though in this context it is clearly a plural noun rather than a verb. In contrast, in the first hit, "move" is correctly matched to the more specific term "go," while in the second, it correctly matches the inflected form "moves."

The method of the invention thus finds passages within texts that contain answers to a specific information request, and ranks them by the degree to which they are estimated to contain the information sought.

2E. Specific Method for Generating Hit Passages in Order of Desired Ranking

FIG. 5 is a top-level flow chart of the method of the invention. A search query is input at box 510, and at box 520 the method identifies target regions in the corpus that contain matches for the query (search) terms. This is carried out using the outputs of the term indexing modules 90 and 100 shown in FIG. 2, according to the procedure detailed in Section 2F below.

At box 530, the processor 20 fills the output buffer with the sorted list of query hits, in a procedure detailed in FIG. 5A and Section 2F below. The ranked list of hits is then displayed on display 50, and/or may be stored as a file in mass storage for future use.

At box 550, the actual hits are displayed and/or stored according to their assigned ranks. Hit terms are highlit, and hyperlinks are provided to targeted text, i.e. the documents in which the hit passages were located.

This completes the processing of a given query, if there is another query, the method proceeds from box 560 to box 510, and otherwise ends at box 570.

2F. Method for Identifying Target Regions and Sorting Query Hits

This section discusses the method of the invention for carrying out step 520 of FIG. 5. The following six steps are carried out to accomplish this. When the query is made, documents are located by using the results of the index modules 90 and 100, as mentioned above, thus providing to the processor a series of documents within with matches for the query terms should be found. Within each such document in which query term matches are found to occur, the following steps 0–6 are executed by the processor. Their operation becomes clearer in the subsequent discussion of FIG. 5A.

0. The proximity buffer is initially seeded with the first entailing term hit generated by the entailing term generator for this document and an operating parameter penalty-threshold is set to *maximum-penalty-threshold*, the maximum penalty that will be accepted for a query hit. (In the preferred embodiment, this parameter is set to 50. This parameter can obviously be varied and can be made subject to control by the user.)

As mentioned above, the proximity buffer corresponds to the "window" that the method effectively moves through a given document, defining regions of the document where term hits are to be found. The proximity buffer stores everything in a given window, as well as information identifying the size of the window and its position in the document. The "size" of the window may be defined by the beginning position of the window in the document plus the proximity horizon, i.e. the end of the window in the document, which is a variable position as discussed below.

1. The proximity horizon is set based on the position of the first hit in the proximity buffer by adding the proximity window size determined for this query. The proximity buffer is then filled with all qualified entailing term hits, i.e. all of the entailing term hit occurrences that occur within the proximity horizon, by stepping the entailment term hit generator until the next hit would be beyond the proximity horizon or until there are no more entailing term hits. If an entailing term hit is generated that is beyond the proximity horizon, it is left in the generator store to be generated later. These entailing term hits are generated by the method described below in Section 2H.

In the preferred embodiment, the proximity horizon is set to pick up entailing hits within a number of characters equal to: (a) the number of terms in the query times the parameter *proportional-proximity* (e.g. 100), if this parameter is set (by the user or an application); or to (b) a *proximity-threshold* (e.g. 300) number of characters from the position of the first hit in the buffer, if the proportional-proximity parameter is not set. These parameters can be varied or made to depend on the query in other ways, and can be made subject to control by either the user or an executing application or process, or both.

2. The best scoring query hit that can be made from the current contents of the proximity buffer and whose penalty is less than the penalty-threshold is found by the method described below in Section 2G. If no such match can be made, skip to step 6.

3. If this query hit scores no better than the worst hit in the output buffer and the output buffer is already full, this hit is discarded and the method skips to step 6 below. If this query hit overlaps another query hit already in the output buffer, then that hit is replaced with this hit if this hit has a better score, or else this hit is discarded if its score is not better. Otherwise, this query hit is inserted into the output buffer at the appropriate rank according to its penalty score, throwing away the worst hit in the buffer if the buffer was already full. If the output buffer is now full, the parameter penalty-threshold is set to the worst query penalty in the output buffer.

4. If the output buffer is full and the last hit has zero penalty, then the method stops generating hits and return the contents of the output buffer.

5. If there are no more entailing hits to generate, then the method stops and returns the contents of the output buffer.

6. Otherwise, the first term hit in the proximity buffer is removed from the proximity buffer, and the method proceeds to step 1.

The foregoing summary of the method of identifying and sorting query hits is clarified by the flow chart of FIG. 5A. In general, the method 600 involves the steps of moving a window on the document, the window having a fixed length depending upon the query size, and anchoring the window at some point on the document (beginning with the first entailing term hit). For each window position, the method searches for a passage containing matches for the query terms. The best such matches are put in the output buffer until predetermined maximum number of perfect matches has been located, or until the search has exhausted all documents.

At box 610 of FIG. 5A, the method begins identification of target regions containing matches for the query terms.

At box 620, the proximity buffer is seeded with the first entailing term hit for the current document, and at box 630 the penalty threshold is set to a predefined maximum. An "entailing term hit" may be defined as follows: for each in the query, there is some set of terms in the term/concept relationship network that could entail that query term. A match for a given query term may include either that query term precisely or some other term that entails that query term. Either type of match is thus referred to herein as an entailing term hit, and the set of all such entailing term hits relative to all such query terms may be referred to as the "entire entailing set".

At box 640, the proximity horizon is set as discussed above, i.e. the window is positioned at the next entailing term hit for the current target passage. (At the first pass through this box, the "next" entailing term hit is the first entailing term hit.) At box 650, the proximity buffer is then filled with all qualified entailing term hits as defined in step 1 above.

At box 660, the method determines whether there is any query hit that can be made from the term hits in the proximity buffer with a penalty better than (i.e. lower than) the current penalty threshold. On the first pass through, this will be a comparison with the predefined maximum penalty threshold. If there is no such query hit that can be made from the term hits within the proximity buffer, then the first hit in the proximity buffer is removed at box 740, and the proximity horizon is reset at box 640 with the beginning of the window at the (new) first term in the proximity buffer.

At box 650, the proximity buffer is again filled with qualified entailing term hits (defined in step 1 above), which in this example results in effectively moving the proximity window down one entailing term hit relative to the previous iteration of step 650. At box 660, it is again determined whether there is any query hit that can be made from the (new) contents of the proximity buffer with a penalty lower than the current penalty threshold, and the process continues.

If a query hit is found that meets this test, then the method proceeds to box 670, where the best query hit (i.e. the query hit with the lowest penalty) in the proximity buffer is designated as the "current" query hit. The best-scoring query hit in the proximity buffer is determined as described generally in Sections 2A–2C above, and a detailed procedure for doing so according to a preferred embodiment is set forth in Section 2G below.

At box 680, it is determined whether the current query hit's penalty is better (lower) than the worst hit in the output buffer (where the best query hits are stored in preparation for output to display or to a file upon completion of the search procedure). If not, then the current query hit is discarded at box 730, the first query hit is removed from the proximity buffer at box 740, and the method proceeds back to box 640 as before, to reposition the window for another try at a better query hit.

If at box 680 the current query hit was better than the worst hit in the output buffer, then at box 690 any lower-scored overlaps are suppressed, meaning that any query hit whose target passage overlaps with the target passage of the current query hit is compared with the current query hit, and the query hit with the lower-score (higher penalty) is discarded. If these two query hits have the same penalty score, then the first query hit is retained.

At box 700, if the output buffer is full, then at box 710 the processor discards the lowest-scoring entry in the output buffer. The method then proceeds to step 720, where the current query hit is inserted into the output buffer. This is done by an insertion sort, i.e. the penalty of the current query hit is compared with the first hit in the output buffer, and if it is lower it is inserted above the latter and all the other hits are moved down. If not, then the current hit's penalty is compared with that of the next hit in the output buffer, until one is found that the current hit's penalty exceeds, and the current hit is inserted at that point and the other hits are moved down. This ensures that the output buffer is always sorted upon insertion of the current hit.

Other variations are possible, such as inserting by comparing with the lowest-scoring hit in the output buffer and moving up (coming from the opposite end, in effect), or doing a sort after the search is completed. Other sorts (such as tree sorts) would also be suitable; however, an insertion sort is one convenient method for comparing new current hit penalties with those already stored, and for filling the output buffer and sorting it simultaneously.

At box 750, the method determines whether the output buffer is now full, given the addition of the latest current query hit. If it is, then the penalty threshold is set to that of the worst query in the output buffer (box 760), and in either case the method proceeds to box 770. Here it is determined whether the last query hit in the output buffer had zero penalty; if so, this indicates that the output buffer is full with zero-penalty hits, and there is no point in searching further, so the method proceeds to box 790, where the contents of the output buffer are returned, and the method proceeds back to step 540 for displaying, storing, etc. the hits, as before. Note that the size of the output buffer may be selected by the user or set by an executing process, so in general it is variable in size.

If at box 770 the last query hit in the output buffer does not have a zero penalty, then at box 780 the method determines whether there are any more entailing term hits to generate, i.e. whether all entailing term hits from the index have been exhausted. If there are no more hits to be generated, then the method proceeds to box 790. Otherwise, it proceeds to box 740, where the first entailing term hit is removed from the proximity buffer, so as to reposition the proximity window to the next entailing term hit. The method then proceeds again to box 640.

Upon completion of the method 600 of FIG. 5, the output buffer is filled with query hits in a ranked order from best (lowest penalty) to worst.

2G. Method for Determining Best-Scoring Query Hit

Following is a suitable method for determining which of the entailing term hits in the current proximity buffer can be used in conjunction with one another to form a query hit having the best score, i.e. the lowest aggregate or combined penalty. Thus, this method provides a procedure for actually scoring the term hits located within a window on a document.

A. Let $q1, q2, \ldots, qm$, be the successive query terms of the query q and let $x1, x2, \ldots, xn$ be the sequence of entailing term hits in the current proximity buffer (i.e., within the proximity horizon of the first entailing term hit in the proximity buffer). Search all possible alignments $a=(q1, xi1), (q2, xi2), \ldots (qm, xim)$ of terms in the query with entailing hits from the proximity buffer such that the first term $x1$ in the proximity buffer is aligned with one of the query terms and each query term is paired with either one of the xij's in the proximity buffer that entails it or with a marker that indicates that it is missing. These alignments are searched in order to find the best ranking such hit—i.e., the hit with the lowest penalty score as assigned by the following ranking algorithm:

B. For each pair (qj, xij) sum the following penalties:
1. morphological variation penalty—if qj and xij have the same morphological root, but are not the same inflected or derived form (i.e., are not either both root forms, or both singular nouns, or both third person singular verbs, etc.), then penalize each of the two that is not a root form by an amount determined by the parameter *inflection-penalty* or *derivation-penalty* depending on whether the morphological relationship involved is one of inflection or of derivation. (In the preferred embodiment, these penalties are 0.08 and 0.1, respectively. This component of the ranking penalty can obviously be modified to use different penalties or to incorporate different penalties for different kinds of inflection or derivational relationship.)
2. taxonomic specialization penalty—if (the root of) qj is a more general term than (the root of) xij according to the subsumption taxonomy, then penalize the alignment by an amount determined by the parameter *descendants-penalty*. (In the preferred embodiment, this parameter is 0.1. This component of the ranking penalty can obviously be modified to use a different penalty or to incorporate a dimension of semantic distance between the more general term and the more specific term.)
3. semantic entailment penalty—if (the root of) qj is semantically entailed by (the root of) xij according to the known entailment relationships, then penalize the alignment by an amount determined by the parameter *entailments-penalty*. (In the preferred embodiment, this parameter is 0.1. This component of the ranking penalty can obviously be modified to use a different penalty or to incorporate a dimension of entailment strength between the query term and the entailing term.)
4. missing term penalty—if (the root of) qj cannot be aligned with any of the xij terms in the proximity buffer by one of the above relationships (same morphological root, taxonomic specialization relationship between roots, or semantic entailment relationship between roots) and is therefore marked as missing, then penalize that term with a penalty determined as follows:
    if the term is in one of the following syntactic word classes:
        (adverb auxiliary conjunction initial interjection modal nameprefix operator possessive preposition pronoun punctuation title)
        then penalize it by *missing-qualifier-penalty*
    if the term is or can be a verb
        then penalize it by *missing-verb-penalty*
    if the term is one of the syntactic word classes
        (adjective, determiner)
        then penalize it by *missing-adjective-penalty*
    otherwise penalize it by *missing-term-penalty*
(In the preferred embodiment, the missing-qualifier-penalty is 2; the missing-verb-penalty is 5; the missing-adjective-penalty is 7.5; and the missing-term-penalty is 10. This component of the ranking penalty can be modified to use different penalties or different categories of penalties or to incorporate a dimension of term frequency or term importance or syntactic role to determine the penalty for a missing term.)

C. To the above accumulated penalties, add the following penalties that are determined for the alignment as a whole:
5. proximity ranking penalty—For each successive pair of entailing terms in the alignment in order of their occurrence in the text, penalize any gap between them that is larger than a single character by an amount equal to the parameter *gap-penalty-factor* times one less than the number of characters between them. (In the preferred embodiment, this parameter is 0.005. This component of the ranking penalty can obviously be modified to use a different penalty factor or to use a word count or other proximity measure other than a character count to measure the gap between words.)
6. permutation penalty—For each successive pair of query terms, if the corresponding entailing terms in the alignment are not in the same order in the text, then penalize this hit by an amount equal to the parameter *out-of-order-penalty*. (In the preferred embodiment, this parameter is 0.25. This component of the ranking penalty can obviously be modified to use a different penalty factor or to use various other measures of the degree to which the order of the terms in the hit is different from the order of terms in the query.)
7. internal boundary penalty—Scan the portion of the text covered by the region from the earliest entailing hit of the alignment to the latest entailing hit of the alignment and for each sentence boundary or paragraph boundary contained in that portion of the text, add a penalty equal to the parameter *cross-sentence-penalty* or *cross-paragraph-penalty* depending on whether the boundary is an end of sentence or a paragraph boundary. (In the preferred embodiment, these parameters are 0.1 and 50, respectively. This component of the ranking penalty can obviously be modified to use different penalties.)

If at any point it can be determined that the penalty score of a partially generated alignment is already worse than the score of some other alignment that can be generated or is worse than the specified penalty threshold, then the inferior partial alignment can be discarded at that point and not considered further. There are many conventional techniques for performing such searches to be found in the literature on computer science search algorithms.

D. Choose the alignment with the best (smallest) total penalty if one can be found that is better than the penalty threshold. This completes the penalty scoring of the terms, and hence the location of the best-scoring query hit from the current proximity buffer.

2H. Method for Generating Entailing Term Hits

This method utilizes the term/concept relationship network 110, which can either be constructed manually off-line or automatically constructed during the indexing process by the method described Section 1, and further described in Section 2I below, using a knowledge base of manually constructed relationships and morphological rules. In this network, any given term that occurs in the corpus of indexed material or may occur in a query term is represented and may be associated with one or more concepts that the term in question may denote. These words and concepts in turn can be related to each other by the following morphological, taxonomic, and semantic entailment relationships:
1. term x is a root form of an inflected or derived term y.
2. term or concept x taxonomically subsumes term or concept y (i.e., term or concept x is a more general term or concept than term or concept y).
3. term or concept x may be entailed by term or concept y.

In general, these relationships must be looked up in knowledge bases of such relationships (120, 150 and 180), which are constructed off-line by data entry. Some morphological relationships, however, can be derived automatically by morphological rules applied to inflected and derived forms of words encountered in the text. Such morphological rules are generally part of the conventional systems in computational linguistics.

The entailing terms for a query q=q1, q2, . . . , qm (the "entire entailing set") will be the set of all terms that occur in the corpus that entail any of the terms qi in q, where a term x entails a term qi if any of the following hold:

1. x or a root of x is equal to qi or a root of qi
2. x or a root of x taxonomically subsumes qi or a root of qi or a concept denoted by x or a root of x taxonomically subsumes qi or a root of qi or a concept denoted by qi or a root of qi
3. x or a root of x is semantically entailed by qi or a root of qi or a concept denoted by x or a root of x is semantically entailed by qi or a root of qi or a concept denoted by qi or a root of qi.

The entailing term hits for a query q=q1, q2, . . . , qm will be the sequence of all term occurrences in the corpus that entail any of the terms qi in q or any concepts that are denoted by terms qi in q. These entailing term hits are generated in order of their occurrence in the corpus by creating a collection of generators for each entailing term, each of which will generate the occurrences of that term in order of their occurrence in the corpus (determined first by a default ordering of all of the documents of the corpus and secondarily by the position of the term occurrence within a document). At any step of the generation, the next generated entailing term hit is generated by choosing the entailing term generator with the earliest hit available for generation and generating that term hit. At the next step of generation, a different entailing term generator may have the earliest hit available to generate. This entailing term hit generator can be called repeatedly in order to find all of the entailing term hits that occur within a window of the corpus starting at some term occurrence in some file and continuing until some proximity horizon beyond that root term occurrence has been reached.

2I. Generating the Term/Concept Relationship Network

During indexing as described in Section 1 above (or in a separate pass) as each word or phrase in the indexed material is encountered, it is looked up in a growing term/concept relationship network 110 of words and concepts and relationships among them that is being constructed as the corpus is analyzed. If the word or phrase is not already present in this tern/concept relationship network 110, it is added to it.

The first time each such word or phase is encountered, it is also looked up in manually constructed external knowledge bases of word and concept relationships (120, 150 and 180), and if it is found in these external networks, then all words and concepts in the external networks that are known to be entailed by this word or phrase or that are derived or inflected forms of this word or phrase are added to the growing term/concept relationship 110 network together with the known relationships among them. If such a word or phrase is not found in the external network, then it may be analyzed by morphological rules to determine if it is an inflected or derived form of a word that is known in the external knowledge bases (120, 150 and 180), and if so, its morphological relationship to its root is recorded in the term/concept relationship network and its root form is treated as if it had occurred in the corpus (i.e., that root is looked up in the external networks and all of its entailments, inflections, derivations, and relationships are added).

At the end of this process, a term/concept relationship network will have been constructed that contains all of the terms that occur in the corpus plus all of the concepts entailed by or morphologically related to them, together with all of the known morphological, taxonomic, and entailing relationships among them. This network is then used in processing queries to find entailing term hits for query terms.

2J. Query Size Procedural Adaptation

The system of the invention has in trial runs proven to be particularly effective for handling short queries of two or three words, or perhaps up to about six, in contrast to traditional retrieval methods, which are generally poor at handling short queries. Thus, a further enhancement of the invention may be had by using conventional word search techniques when one or more than some number N words are to be searched. The number N may be preset or may be selected by the user or a process in response to the success of the searching results, and may be 3–6 or more, depending upon the generated results. Such a system uses the best of both conventional techniques and the present invention, whose operation would thus be confined to the particularly difficult region of queries with just a few words.

The system of the invention has in trial runs proven to be particularly effective for handling short queries of two or three words, or perhaps up to about six, in contrast to traditional retrieval methods, which are generally poor at handling short queries. Thus, a further enhancement of the invention may be had by using conventional word search techniques when one or more than some number N words are to be searched. The number N may be preset or may be selected by the user or a process in response to the success of the searching results, and may be 3–6 or more, depending upon the generated results. Such a system uses the best of both conventional techniques and the present invention, whose operation would thus be confined to the particularly difficult region of queries with just a few words.

2J. Document Retrieval Application

This passage retrieval technique can be applied to conventional document retrieval problems, to retrieve and rank documents by giving each document the score of the best passage it contains.

What is claimed is:

1. A method for locating information in documents in a database stored in a memory coupled to a processor, the method being carried out by program steps executed by said processor, including the steps of:

(1) receiving a search query including at least one query term;
   (2) generating at least one hit passage from said documents, said hit passage including at least one hit term corresponding to said at least one query term;
   (3) for at least a first hit term and a second hit term corresponding, respectively, to at least a first query term and a second query term, determining a first distance between said first and second hit terms and a second distance between said first and second query terms;
   (4) generating a factor having a magnitude based upon a comparison of said first distance with said second distance; and (5) generating a score for said hit passage incorporating the magnitude of said factor.

2. The method of claim 1, wherein:

step 2 includes the step of generating a plurality of said hit passages;

step 3 is carried out for at least two said hit terms in each of said plurality of hit passages;

step 4 is carried out for each of said distances determined in step 3 for each set of corresponding hit terms and query terms; and step 5 is carried out for said plurality of hit passages.

3. The method of claim 2, further including the steps of:

after step 5, determining a best-scored said hit passage; and retrieving at least said best-scored hit passage.

4. The method of claim 2, further including the steps of:

after step 5, determining a best-scored said hit passage; and retrieving at least a document containing said best-scored hit passage.

5. The method of claim 1, wherein said score is generated at least in part based upon a factor proportional to said first distance.

6. The method of claim 3, including the step of providing at least one hyperlink in said retrieved passage, said hyperlink linked to the document containing said passage.

7. A method for locating information in documents in a database stored in a memory coupled to a processor, the method being carried out by program steps executed by said processor, including the steps of:

(1) receiving a search query including at least a first query term and a second query term in a first order;

(2) generating at least one hit passage from said documents, said hit passage including at least a first hit term corresponding to said first query term and a second hit term corresponding to said second query term, said first and second hit terms being in a second order;

(3) generating a factor having a magnitude based upon a comparison of said first order with said second order; and (4) generating a score for said hit passage incorporating the magnitude of said factor.

8. A method for locating information in documents in a database stored in a memory coupled to a processor of a computer system, the computer system further including a proximity buffer and an output buffer coupled to said processor, the method comprising:

(1) retrieving a search query including at least one query term;

(2) determining at least one target region of at least one said document in said database;

(3) setting a penalty threshold to a predetermined maximum;

(4) determining query hits corresponding to said query terms within said target region and correlating with each said query hit a score reflecting how closely it corresponds to its corresponding query term;

(5) storing said query hits in said proximity buffer;

(6) designating a best-scoring query hit from said proximity buffer as a current query hit;

(7) if said output buffer is full, discarding a lowest-scored query hit;

(8) inserting said current query hit into said output buffer;

(9) if said output buffer is now full, setting said penalty threshold to the score of a lowest-scored query hit in the output buffer; and

(10) returning the contents of the output buffer if a predetermined criterion is met.

9. The method of claim 8, wherein the predetermined criterion of step 10 is whether the last lowest-scored query hit in the output buffer has zero penalty.

10. The method of claim 8, wherein the predetermined criterion of step 10 is whether all documents have been searched.

* * * * *